H. A. CHRISTY.
CAR ROOF.
APPLICATION FILED JAN. 6, 1913.
1,068,319.
Patented July 22, 1913.
9 SHEETS—SHEET 8.
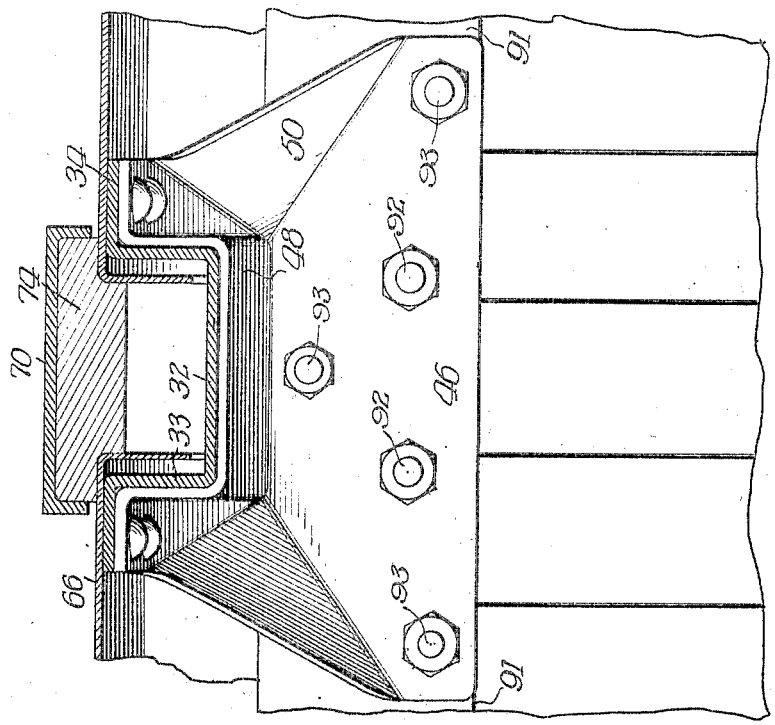
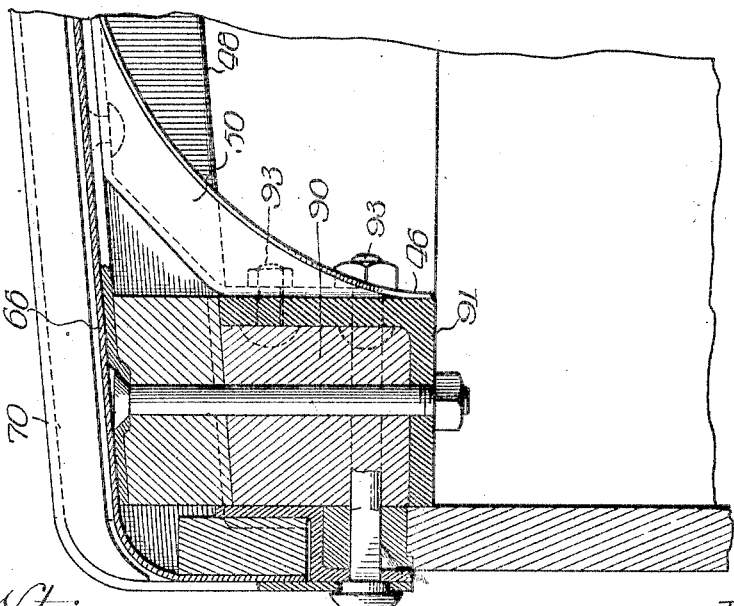

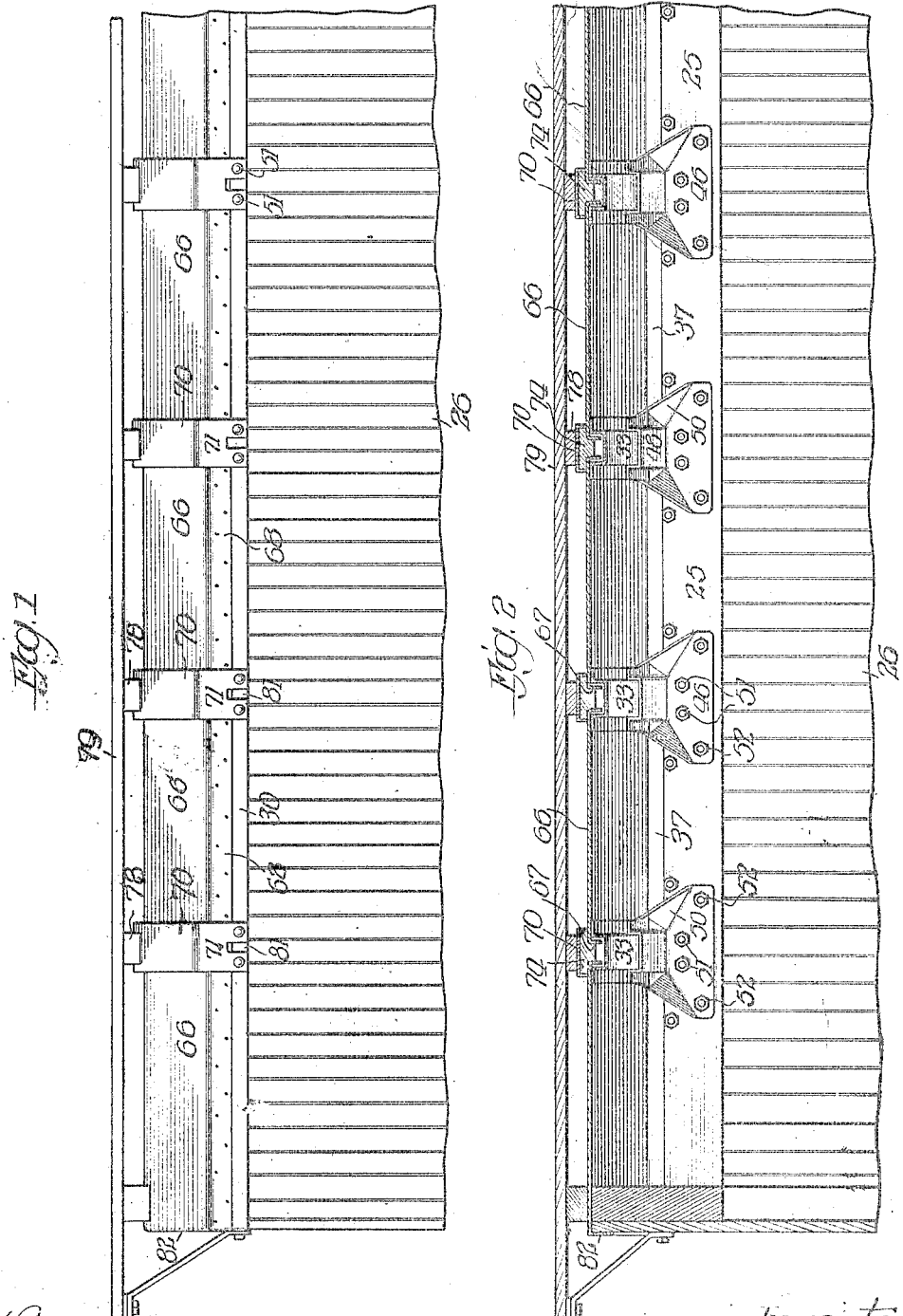

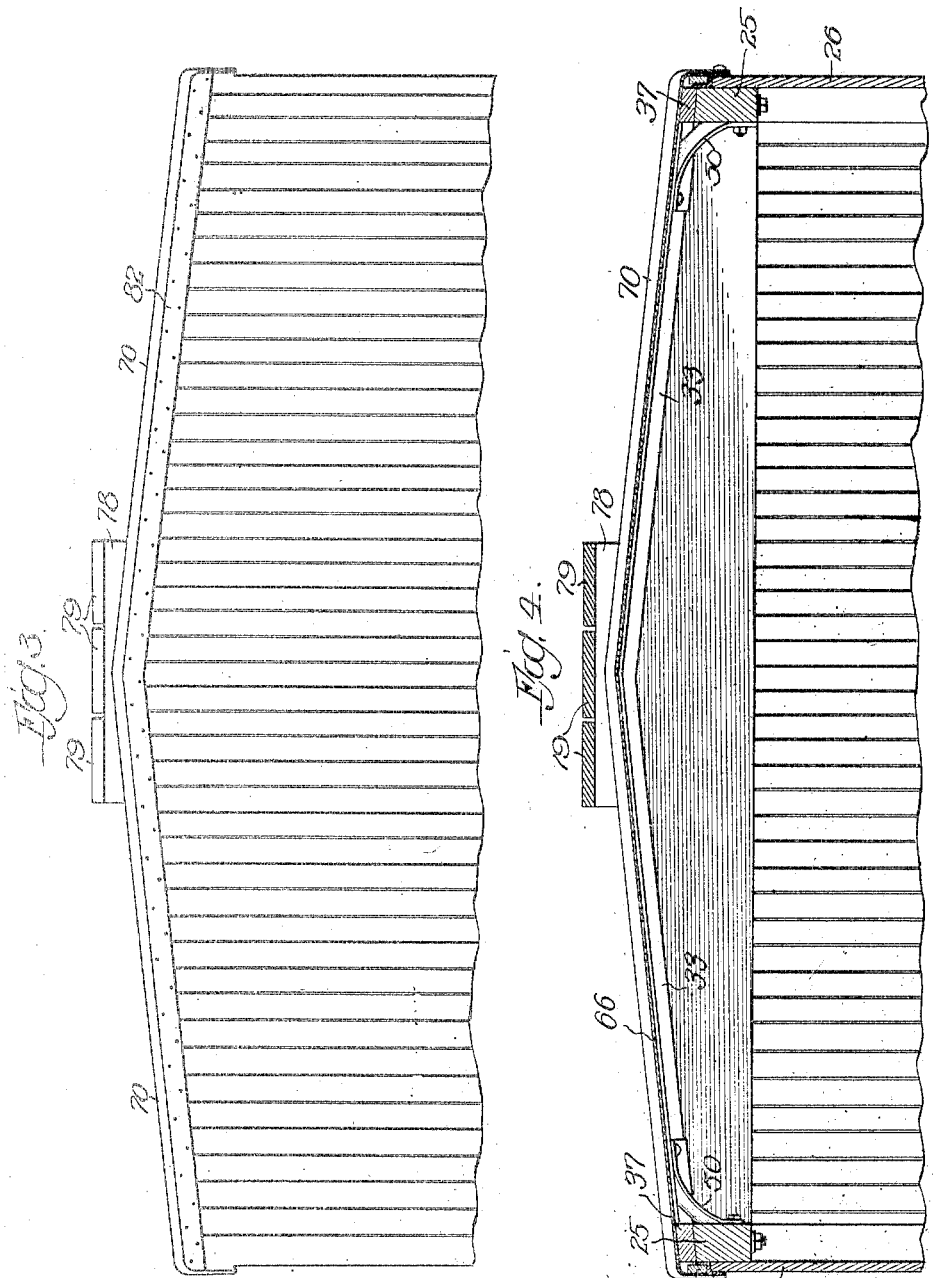

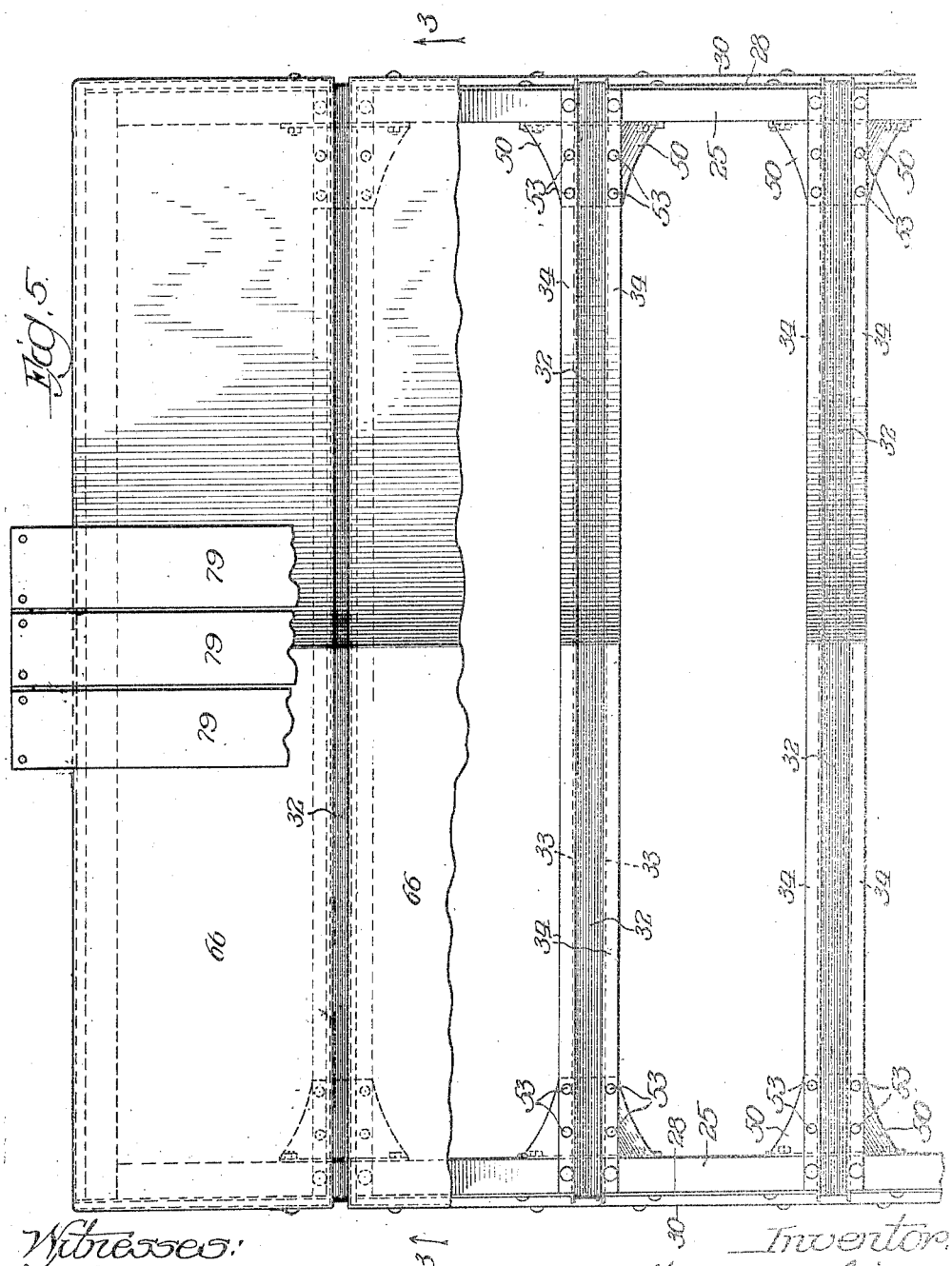

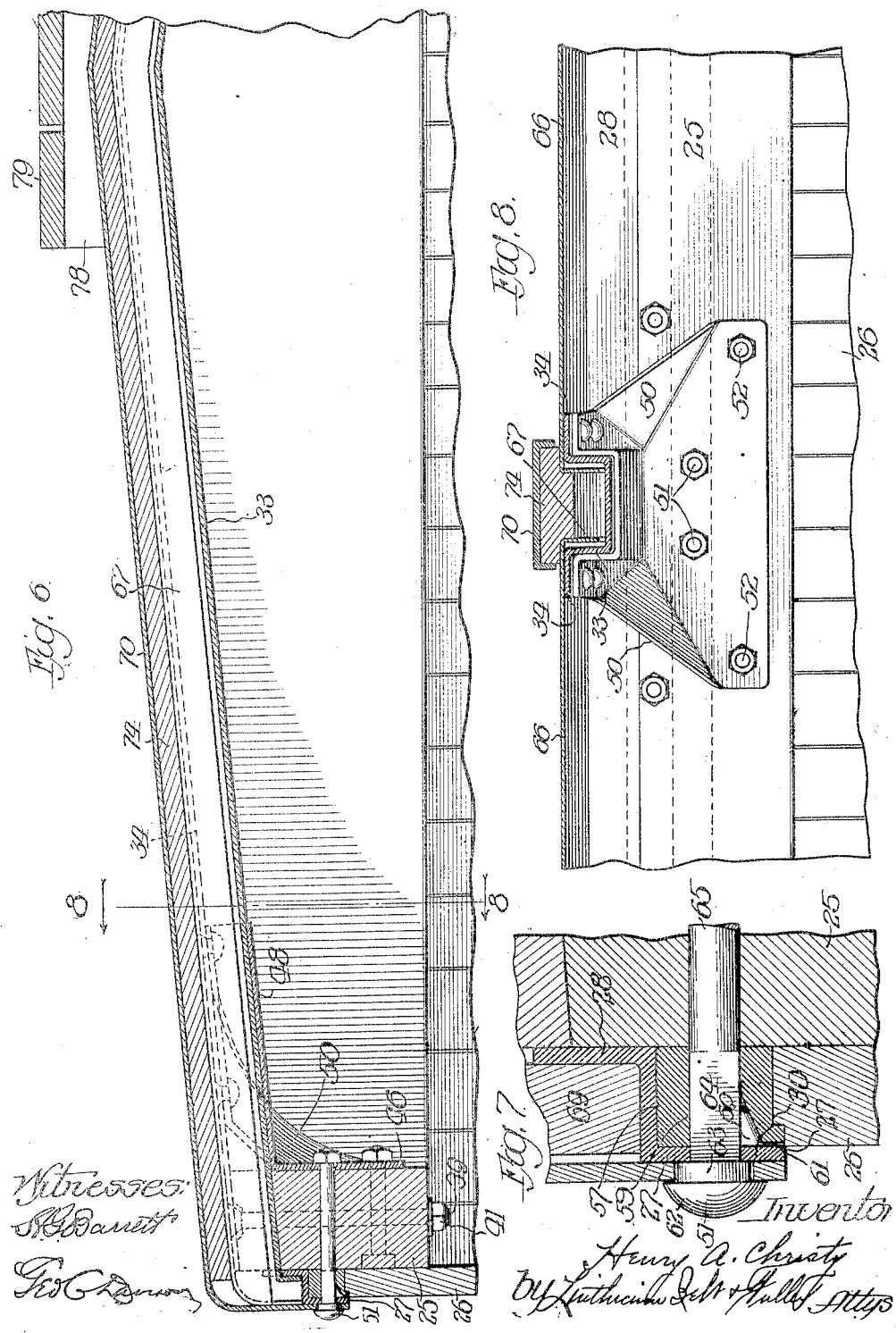

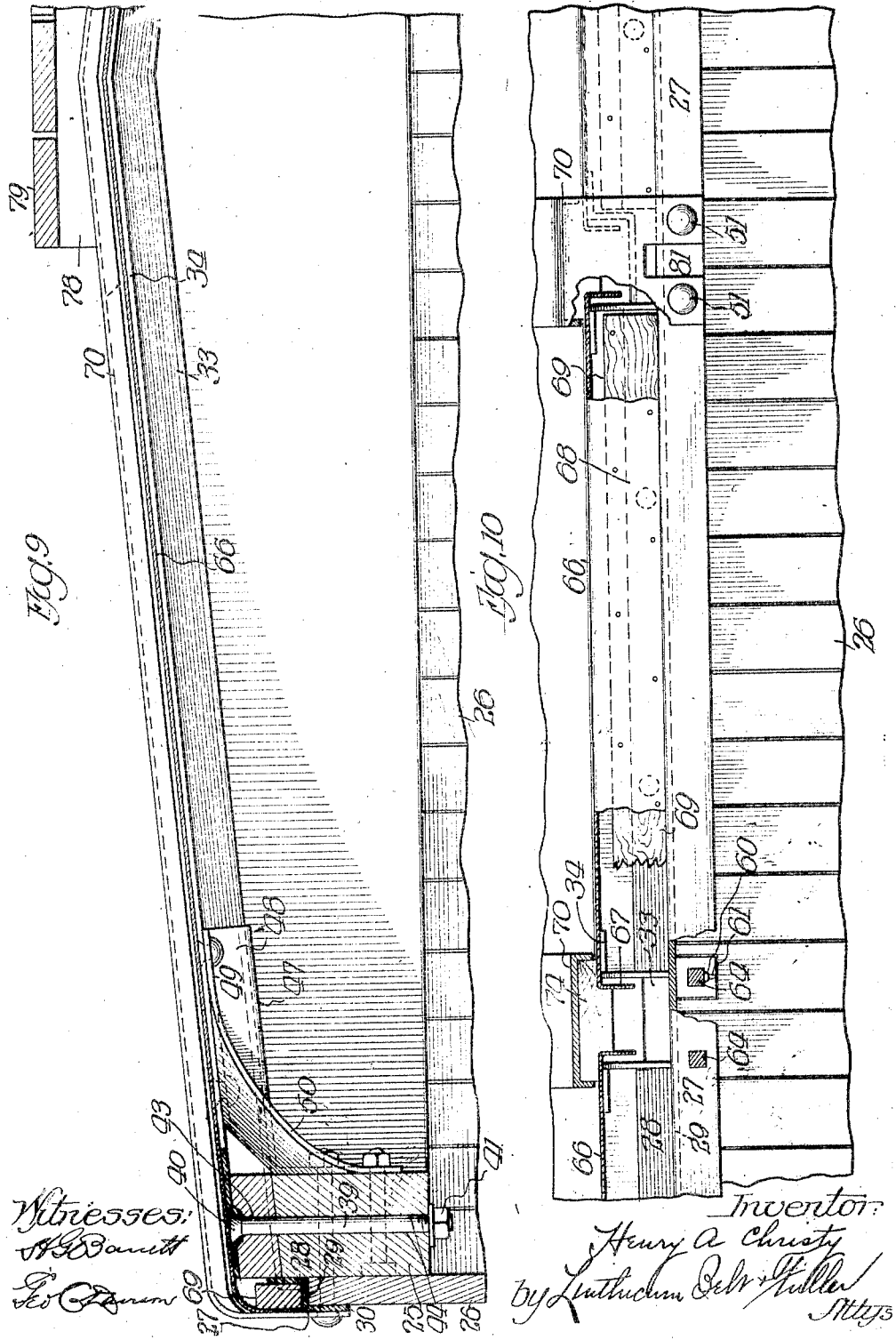

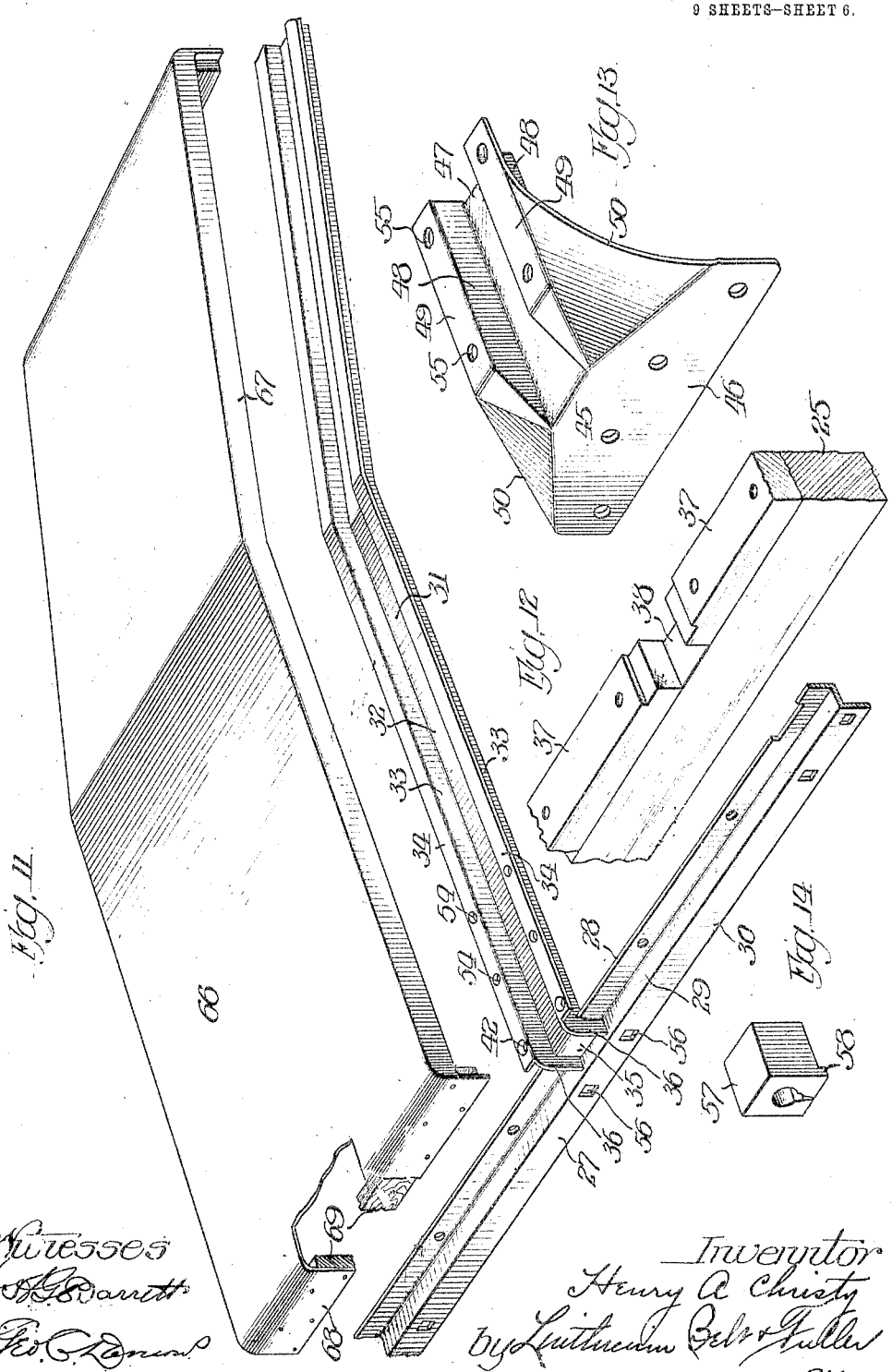

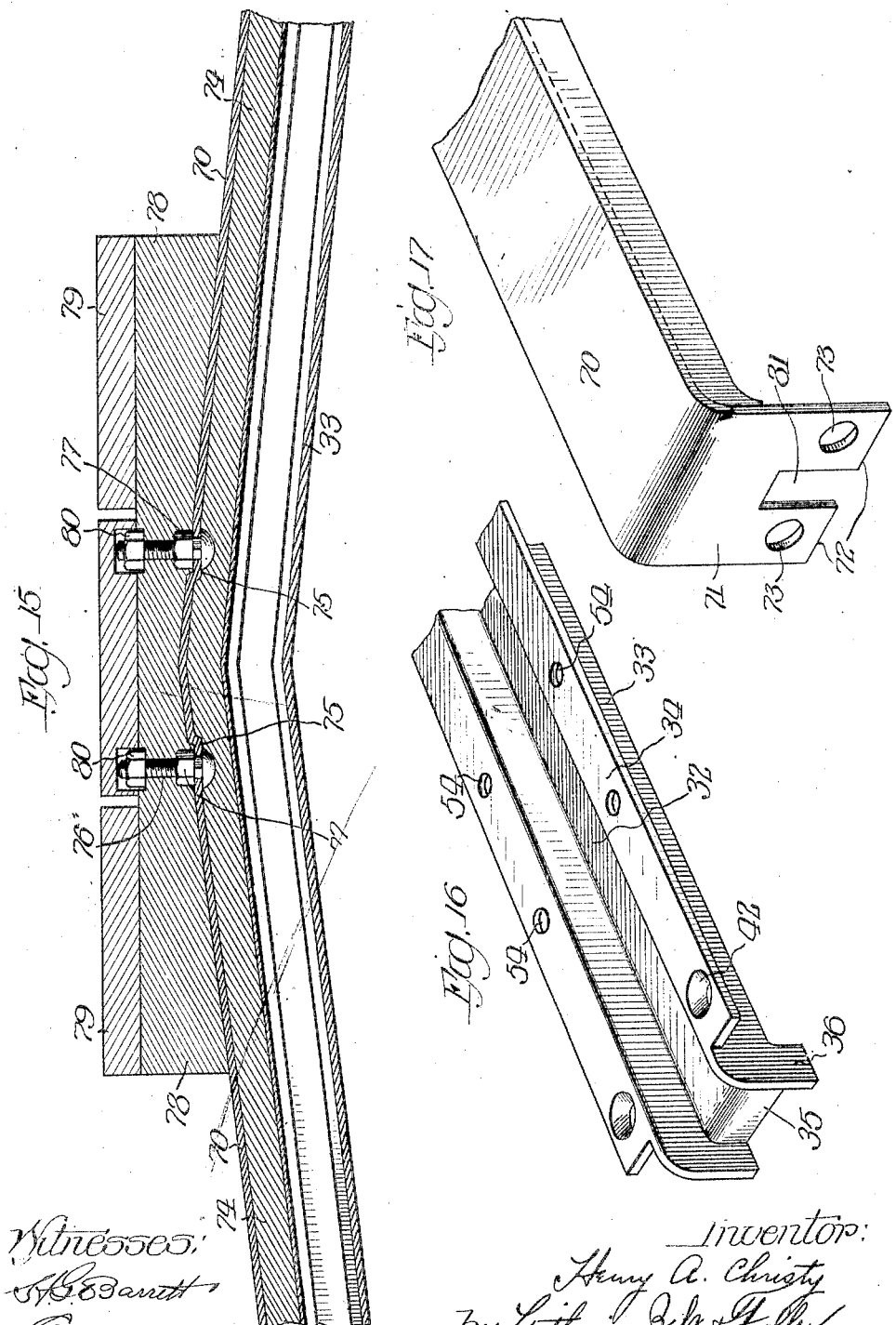

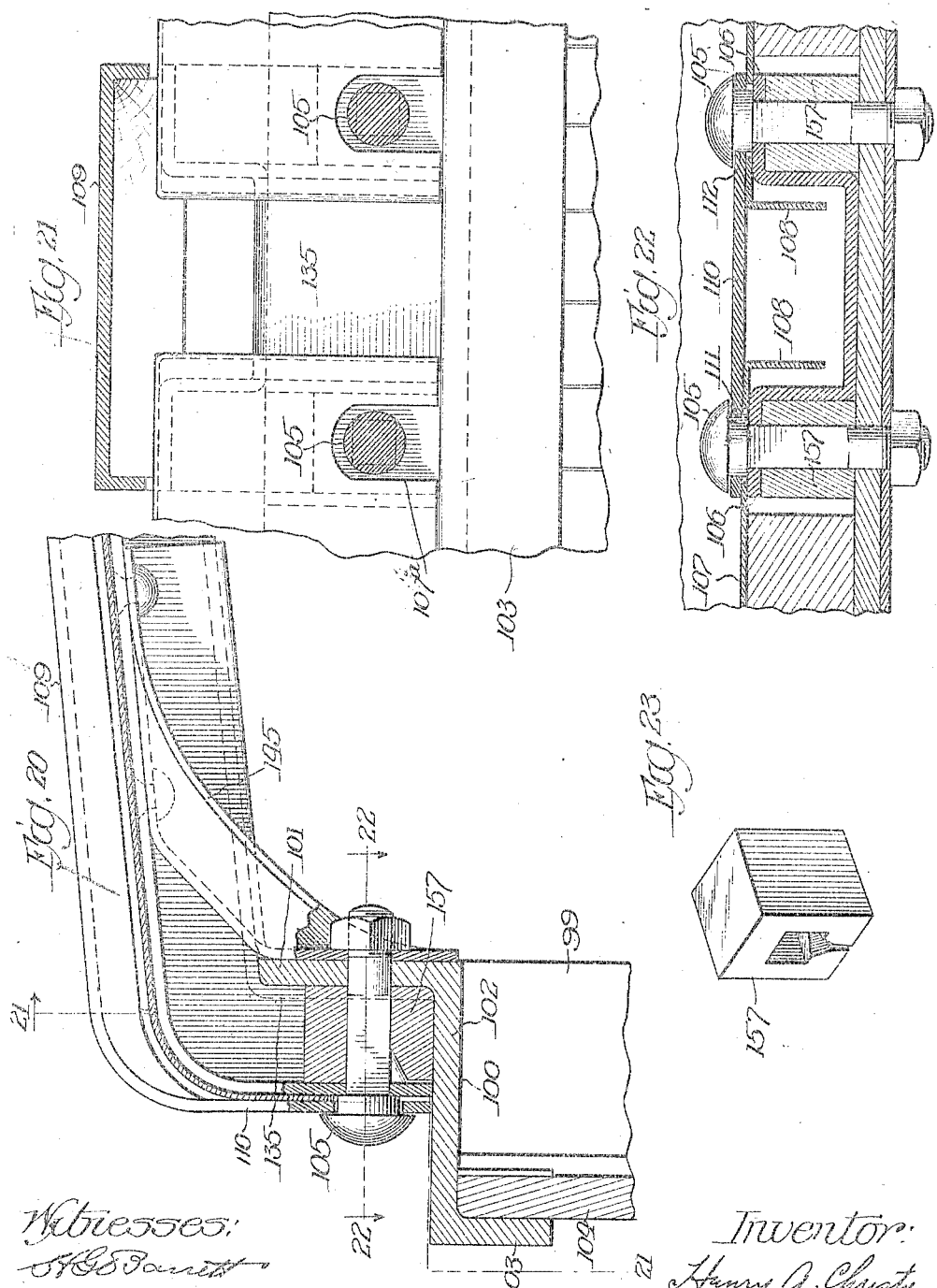

UNITED STATES PATENT OFFICE.

HENRY A. CHRISTY, OF KENILWORTH, ILLINOIS.

CAR-ROOF.

1,068,319.  Specification of Letters Patent.  Patented July 22, 1913.

Application filed January 6, 1913. Serial No. 740,355.

*To all whom it may concern:*

Be it known that I, HENRY A. CHRISTY, a citizen of the United States, residing at Kenilworth, in the county of Cook and State of Illinois, have invented certain new and useful Improvements in Car-Roofs, of which the following is a specification.

The main and leading object of this invention is the provision of an inexpensive metal roof for railway-cars, which shall possess the required flexibility to meet the requirements found in railway-car service, and which shall be weather-proof. In a roof of this character, the parts of the structure must be so associated together as to permit them to have a limited free and independent movement in order not to occasion damage or injury to the roof by reason of the uneven settling of the car-body.

One purpose, therefore, of this invention is to build the roof in such a manner as to permit the flexing or relative shifting of its structural elements without impairing its rain and wind-proof characteristics.

In the accompanying drawings, I have illustrated a preferred and desirable embodiment of this invention, which drawings should be considered in connection with the accompanying specification wherein a detailed description of this embodiment is set forth.

In these drawings: Figure 1 is a fragmentary side elevation of a car-roof structure embodying the invention; Fig. 2 is a fragmentary central longitudinal vertical section through the portion of the car-roof illustrated in Fig. 1; Fig. 3 is a fragmentary end-view of a car-body equipped with such roof; Fig. 4 is a transverse vertical section through the roof structure on line 3—3 of Fig. 5; Fig. 5 is a fragmentary plan view of the roof, a portion of the roof-plates, and a section of the running-boards being cut away to more clearly illustrate the construction; Fig. 6 is an enlarged fragmentary transverse vertical section through the roof, the plane of section being coincident with the middle of one of the carlines; Fig. 7 is an enlarged fragmentary section at the upper portion of the side-wall; Fig. 8 is a vertical section on line 8—8 of Fig. 6; Fig. 9 is a transverse vertical section similar to that of Fig. 6 but taken on a plane between carlines; Fig. 10 is a fragmentary face view at the upper portion of the car-body side-wall, parts being broken away to more clearly illustrate the features of construction; Fig. 11 shows perspective views of one of the roof-plates, carlines, and Z-bars; Fig. 12 illustrates in perspective one of the car-body side-plates; Fig. 13 shows in perspective one of the sheet-metal braces for the carlines; Fig. 14 illustrates one of the metal blocks through which the attaching-bolts pass; Fig. 15 is an enlarged detail cross-section at the central portions of the roof-structure; Fig. 16 is a fragmentary perspective view of the end-portion of one of the carlines; Fig. 17 is a similar view of one of the cap-strips; Fig. 18 is a cross-section at the side-wall of the car illustrating a modified form of construction; Fig. 19 is a section at right angles to that of Fig. 18; Fig. 20 is a detail section through the upper portion of the side-wall of a modified form of roof; Fig. 21 is a section on line 21—21 of Fig. 20; Fig. 22 is a horizontal section on line 22—22 of Fig. 20; and Fig. 23 is a perspective view of one of the blocks associated with the fastening-bolts.

Referring to the form of construction shown in Figs. 1 to 17 inclusive, it will be noticed that the car-body has the usual wooden side-plates 25, 25 and the sheathing 26, 26. At each side of the car, just above the sheathing so as to cover and lap over the same, I provide a longitudinal Z-bar 27 having, as shown for example in Fig. 9, one vertical flange 28 resting against the outer face of the side-plate 25, a horizontal web 29 immediately above the sheathing 26, and an outer depending vertical flange 30 disposed just outside of the sheathing.

The cambered channel carlines 31 extend from side-wall to side-wall with their troughs upwardly presented. Each carline has a bottom web portion 32, and a pair of upstanding vertical walls 33, 33, having along their top edges outwardly-extended, oppositely-disposed marginal flanges 34, 34. At each end each carline has its web 32 bent down to form a depending-portion or ear 35, the flanges 33 also conforming to the bend of the web and constituting outstanding-flanges or-ribs 36, 36, but the flanges 34 are preferably omitted from the downturned ends of the carlines, all as is clearly illustrated in Fig. 11. These depending ends of the carlines extend over the flanges 28 just outside of the same, and in order to support and properly space these carlines from one another, I position on top of each side-plate 25 a plurality of blocks 37, 37, the ends of which are separated from one another and shaped to provide seats 38 of the form and for the accommodation of the end-portions of the carlines, as is illustrated. To fasten the carlines in place, I provide registering apertures in the flanges 34, the blocks 37 and the side-plate 25, for the accommodation of holding-bolts 39, (Fig. 9), having at one end conical heads 40 received in correspondingly-shaped seats in the flanges of the carlines, and having at their opposite ends the tightening nuts 41 disposed below the side-plate. These registering apertures in the three parts I have characterized respectively 42, 43, and 44.

It is my intention to so adequately brace the ends of these carlines to the side-plates that it will not be necessary to employ a ridge-pole, thereby doing away with the necessity of means to fasten such ridge-pole to the carlines, with the resulting possibility of leakage through the roof. In order to bring about this result, I use at the end of each carline a sheet-metal brace 45 of the form and shape illustrated in perspective in Fig. 13. Each of these braces has a flat portion 46 adapted to be fastened against the inner surface of the side-plate 25. Extending centrally from this plate 46 and substantially at right angles thereto is an inner plate-portion 47 bounded by a pair of upstanding-walls 48, the latter being equipped along their upper margins with oppositely-extended flanges 49, these latter flanges, the walls 48, and the part 47 being braced relatively to the portion 46 by the integral tapered sections 50, 50 constituting connections between the plate 46 and the flanges 49. As is illustrated in the various figures the plate 46 of each bracket or brace is fastened against the inner surface of the side-plate 25 by two pairs of bolts 51, 51 and 52, 52 in such position that the carline is received in the top trough or cavity of the brace, the flanges 49 being disposed directly beneath the flanges 34 and the web 47 and walls 48, 48, fitting neatly about the corresponding web 32 and walls 33 of the carline.

By means of rivets 53, 53, the flanges 34 of the carlines are fixedly secured to the flanges 49 of the braces, such flanges being apertured at 54 and 55 respectively for the rivets.

The downturned flanges 27 of the longitudinal Z-bars are apertured at 56, 56, in register with the holes in the side-plate and bracket or brace through which the bolts 51 pass. These holes in the flanges 27, as is clearly shown in Fig. 11, are desirably non-circular, for example, square. Between the flange 27 and the side-plate 25, I employ for each aperture 56, a metal block 57 of substantially the same thickness as the sheathing or side-wall 26. Each of these blocks along its outer lower edge has a rib 58 fitting in a corresponding recess cut in the top of the side sheathing. Each block has extended therethrough an aperture 59, square in cross-section in the present instance. As shown in Fig. 7, this aperture is enlarged in the outer portion of the block to provide a cavity 60 with a downwardly-sloping wall, and preferably, a small space 61 is left between the outer face of the block and the inner face of the flange 27 to permit the discharge of any moisture or water which might possibly reach such cavity. Each bolt 51 has a head 62 adjacent to which it has a round body 63 and below this it is supplied with a shank 64 square in cross-section and of substantially the same dimension as the hole 59 in the block 57 and the portion 65 of the bolt extending through the side-plate and brace is cylindrical, being threaded on its end for the accommodation of the usual nut.

Each sheet-metal roof-plate 66 is of cambered or bent form to provide the required slope for the roof, and has along its longitudinal edges depending flanges 67 conforming to and adapted to fit in the troughs of the adjacent carlines. As is clearly shown, (Fig. 8), the roof-plates rest directly on the flanges 34, 34 of the carlines, the roof-plate flanges 67 being spaced away inwardly from the walls 33 of the carlines to permit a limited degree of movement of the parts relatively to one another. At each of its ends, each roof-plate is bent downwardly to provide a flange 68, to the inner face of which is fastened a wooden strip 69. The flanges 67 merge into and end in these downturned portions 68, as is clearly shown in Fig. 11. The wooden blocks or strips 69 do not extend the entire distance from flange 67 to flange 67, so as to leave spaces for the accommodation and reception of the walls or ribs 36 of the carlines, as is indicated in Fig. 10. Above each carline I use a cambered cap strip 70 extending from side-wall to sidewall, which is of inverted channel shape, being of sufficient width to overlap the adjacent portions of adjoining roof-plates, as shown in Figs. 8 and 10. At each of its ends each cap-strip has a downturned ear 71 bifurcated to provide a pair of extensions 72, 72, apertured at 73 for the accommodation of the portions 63 of the bolts 51. The holes 73 are of slightly greater diameter than that of the cylindrical parts 63 of the bolts so as to permit a limited shifting of the parts, and the thickness of the section 63 of the bolt is slightly greater than the thickness of the ears 72 so that in tightening the bolts the cap-strips will not be rigidly held in place but may have a slight free movement. To prevent the flanges of the cap-strips from resting upon and ring the roof-plates, each cap-strip is provided with a wooden or other filler 74, which rests upon the roof-plates and has a portion extending down into the carline, between the flanges 67 of adjacent roof-plates. If any water should by any chance pass through the openings of the cap-strip attachment-ear and the flange of the Z-bar and reach the cavity 60, it would be discharged therefrom by passing down its sloping bottom wall and discharging through the small opening or passage 61. In this construction, it is desirable to attach the running-boards to and have them supported by the cap-strips and in this way, together with the omission of the ridge-pole, I am enabled to make a roof-structure extending from side-wall to side-wall, which has no holes through the troughs of its carlines and no apertures through the covering-portions of the roof-plates. In this case, each cap-strip 70 near the middle of the roof is pressed so as to form a pair of horizontal seats 75 to which are attached in any approved manner, a pair of upstanding vertical bolts 76. Preferably, these seats 75 are provided with square holes, the heads of the bolts being inside of the cap-strips, with the wooden fillers 74 cut away for their accommodation. Tightening nuts 77 are employed, which bear against the outer faces of the cap-strips so that the bolts are rigidly and firmly held in position. The transverse wooden running-board supports 78 are held in place by these bolts, and to these supports the running-boards 79 are fastened in any approved manner. As shown in Fig. 15, the nuts 80 of the bolts 76 are accommodated in recesses in the bottom face of one of the running-boards.

To those skilled in this art, it will be apparent that in this construction I have provided a roof-structure which is not only flexible but which is also weather-proof, and wherein there are no holes through the troughs of the carlines or the roof-plates. Also, I am enabled by suitably bracing the carlines to do away with the ridge-pole, fastening the running-boards directly the top of the roof, as by attaching them to the cap-strips.

In a structure of this kind, it is almost impossible for any rain or moisture to reach the troughs of the carlines, but if it does, it is readily discharged through their troughs which at their ends are not closed by the ears of the cap-strips, the latter having central openings 81 for the discharge of such moisture, (see Figs. 16 and 17). If any of the roof-plates become damaged they can be readily removed and replaced.

At the end of the car the end roof-plate fits down over the end-wall of the car-body at 82 and is directly fastened thereto by any approved securing-means. This direct attachment to the end-wall, however, does not decrease the flexibility of the roof, because the flanges of these end-plates are yieldingly accommodated in the adjacent carlines.

The modified construction illustrated in Figs. 18 and 19 is much like that described above, except that the side-plate 90 is reinforced by a longitudinal angle-bar 91. In this case two of the bracket or brace-securing bolts 92, 92, extend through the side-plate as shown, the remainder of the bolts 93, 93, being fastened to the inner vertical flange of the angle-bar 41.

In the third form of construction shown in Figs. 20 to 22 inclusive, the longitudinal Z-bar 100 is positioned above the vertical posts 99 and has a horizontal-web 102, an upstanding inner-flange 101, and a depending outer flange 103 housing between itself and the posts 99 the upper-portion of the side-wall sheathing 104. In this case metal-blocks 157 are disposed above the web of the Z-bar outside of the flange 101, being apertured as in the previous instances for the accommodation of the bolts 105 which secure the braces 145 against the inner face of the flange 101. In this instance the end of each carline including its web, its outstanding-walls, and its marginal flanges, is turned down, such flanges 106 being apertured for the reception of the bolts 105. The roof-plates follow the contour of the carlines, having marginal flanges 107 and other flanges 108 accommodated in the downturned end of the carline. These roof-plates are apertured at 107$^a$ for the reception of the bolts 105, the apertures being sufficiently large to permit movement of the plates relatively to such bolts. The cap-strip 109 also has a depending-end ear 110 apertured at 111 and 112 for the accommodation of the bolts. The holes through the blocks 157 are rectangular in cross-section to correspond in shape to the cross-sectional form of those portions of the bolts received in the blocks, and the depending-ends of the roof-plates and cap-strip are loosely received beneath the heads of the bolts to give the roof-structure the desired resiliency and flexibility.

Of course, various structural changes may be made in the constructions herein outlined without departure from the substance of the invention, and without the sacrifice of any of its substantial benefits and advantages.

I claim:

1. In a railway-car, the combination of a car-body side-wall, a Z-bar disposed longitudinally of the side-wall near the top thereof and having an inner upwardly-extending flange and an outer downwardly projecting flange, channel carlines disposed trough-side upward having channel-ends downturned over the inner flange of said bar whereby the carline drainage takes place over said bar, and metal roof-plates having inturned flanges accommodated in the troughs of said carlines and marginal flanges downturned over said bar, substantially as described.

2. In a railway-car, the combination of a car-body side-wall having sheathing and a side-plate, a metal Z-bar extending longitudinally of the car-body side-wall and covering the top edge of said sheathing, said bar having an inner upstanding flange and an outer depending flange overlapping the outer face of said sheathing, channel carlines disposed trough-side upward and having channel-ends downturned over the inner flange of said Z-bar whereby the carline drainage takes place over said bar, and metal roof-plates having inturned flanges accommodated in the troughs of said carlines and marginal flanges downturned over said Z-bar, substantially as described.

3. In a railway-car, the combination of a car-body side-wall equipped with sheathing, a metal Z-bar extended longitudinally of the car-body and at the top of said sheathing, said Z-bar having an upstanding flange and a downturned flange overlapping the outer face of said sheathing, metal carlines having their ends bent down over the upstanding flange of said bar, sheet-metal roof-plates having marginal flanges bent down over the upstanding flange of said bar, and cap-strips over said carlines having terminal ears overlapping the downwardly presented flange of the Z-bar, whereby the drainage from the roof takes place over the bar, the latter protecting the sheathing and preventing leakage into the interior of the car-body, substantially as described.

4. In a railway-car, the combination of a car-body side-wall equipped with sheathing, a metal Z-bar extended longitudinally of the car-body and covering said sheathing, said Z-bar having an upstanding-flange and a downwardly-presented flange overlapping the outer face of the sheathing, metal channel carlines having their ends bent down over the upstanding flange of said bar, sheet-metal roof-plates having marginal flanges bent down over the upstanding flange of said bar, and cap-strips over said carlines having terminal ears overlapping the downwardly presented flange of the Z-bar, said terminal ears being apertured opposite the troughs of said carlines, whereby the drainage from the roof takes place over the Z-bar, which protects the sheathing and prevents leakage into the interior of the car-body, substantially as described.

5. In a railway-car, the combination of a car-body side-wall having sheathing, a metal Z-bar extended longitudinally of the car-body and above said sheathing, said Z-bar having an inner upstanding flange and an outer depending flange overlapping the outer face of said sheathing, carlines having their ends bent down over the upstanding flange of said bar, sheet-metal roof-plates having marginal flanges bent down over the upstanding flange of said bar, and fillers between the flanges of the roof-plates and the upstanding flange of said bar, whereby the drainage from the roof takes place over said bar, which protects the sheathing and prevents leakage into the interior of the car-body, substantially as described.

6. In a railway-car, the combination of a car-body side-wall having sheathing, a metal-bar extended longitudinally of the car-body and covering the top of said sheathing, said bar having a depending flange overlapping the outer face of said sheathing, metal carlines having their ends bent down over said bar, sheet-metal roof-plates having marginal flanges bent down over said bar, cap-strips over said carlines having terminal ears overlapping the flange of said bar, apertured blocks beneath the flange of said bar, and securing bolts extended through apertures of said carlines, bar-flange, blocks and side-wall, the bottom surfaces of the apertures of said blocks sloping downwardly for the discharge of moisture, substantially as described.

7. In a railway-car, the combination of an apertured side-plate, side-wall sheathing, a metal Z-bar extended longitudinally of the car-body above said sheathing and having an inner upstanding flange and an outer apertured depending flange overlapping the outer face of said sheathing, carlines having their ends bent down over said bar, sheet-metal roof-plates having marginal flanges bent down over said bar, cap-strips above said carlines having apertured terminal ears overlapping the flange of said bar, apertured blocks beneath said flange accommodated in recesses of the sheathing, the bottom walls of said block-apertures sloping downwardly and outwardly for the discharge of moisture, and securing bolts extending through the apertures of said cap-strip ears, said flange, blocks, and side-plate, the cap-strip ears being loosely accommodated beneath the heads of said bolts to give the roof-structure flexibility, substantially as described.

8. In a railway-car, the combination of a car-body side-wall having sheathing and a side-plate, a metal-bar extended longitudinally of the car-body and covering the top edge of the sheathing, metal carlines having their ends bent down over said bar, sheet-metal roof-plates having marginal flanges bent down over said bar, said bar having an outer depending flange overlapping the outer face of said sheathing, cap-strips over said carlines having terminal ears overlapping the outer flange of said bar, braces fastened to the end-portions of said carlines and shaped to conform thereto, and fastening-means extending through said braces, side-plate, bar and terminal-ears of the cap-strips, substantially as described.

9. In a railway-car, the combination of car-body side-walls, channel carlines with oppositely-projecting flanges extending from side-wall to side-wall, sheet-metal braces fastened to said side-walls and shaped with depressions to receive the carlines, said braces having outstanding flanges beneath and secured to the flanges of the carlines, and roof-plates associated with said carlines and side-walls, substantially as described.

10. In a railway-car, the combination of car-body side-walls, channel carlines disposed trough-side upward extended from side-wall to side-wall, said carlines having oppositely-projecting flanges along their top edges, sheet-metal braces fastened to the inner surfaces of the side-walls and shaped with depressions to receive the carlines, each of said braces having a plate-portion adapted for attachment to the side-wall, a section extended laterally therefrom with a depression for the accommodation of the carline and side-brace portions connecting the plate part with the part provided with the depression, and roof-plates associated with said carlines and side-walls, said roof-plates having downturned flanges loosely accommodated in the troughs of said carlines, substantially as described.

11. In a railway-car, the combination of car-body side-walls, channel carlines with oppositely-projecting flanges extended from side-wall to side-wall, sheet-metal braces fastened to said side-walls and shaped with depressions for the reception of the carlines, each of said braces having a plate-portion adapted for attachment to the side-wall and a laterally-extended portion and shaped to conform to and closely fit the under surface of the carline with flanges beneath and fastened to the flanges of the carline, tapered side-portions integral with and connecting and bracing the carline-supporting portion of the brace with the plate-attachment portion, and roof-plates associated with said carlines and side-walls, substantially as described.

12. In a railway-car, the combination of car-body side-walls, channel carlines extended from side-wall to side-wall with their troughs presented upwardly and with their troughs unperforated, sheet-metal roof-plates associated with said carlines and side-walls, apertured cap-strips located over said carlines and extending from side-wall to side-wall, bolts extended upwardly through the apertures of said cap-strips with their heads inside of the cap-strip, running-board supports, nuts for said bolts to hold said running-board supports in position, and clamping-nuts securing said bolts to said cap-strips, substantially as described.

HENRY A. CHRISTY.

Witnesses:
WALTER M. FULLER,
LUTHER JOHNS.